ical shape of the housing 10. Concave surfaces are provided at the upper end 16 and the lower end 18 of the reference element 12 to conform to the convex shape of entropy wave generators 20 and 22. An A.C. voltage generated by an oscillator source 24 energizes the entropy wave generators 20 and 22. The frequency of the energizing voltage produced by the source 24 is preferably on the order of 100 kHz. Entropy generator 20 is positioned with respect to the housing 10 by means of a support 26 and the generator 22 is similarly positioned

United States Patent Office 3,616,697
Patented Nov. 2, 1971

3,616,697
SECOND SOUND SUPPORTED MASS
Donald L. Ensley, San Leandro, Calif., assignor to Harvest Queen Mill & Elevator Co., Dallas, Tex.
Filed Apr. 5, 1968, Ser. No. 719,134
Int. Cl. G01p 15/08
U.S. Cl. 73—505
18 Claims

ABSTRACT OF THE DISCLOSURE

Apparatus and a method for positioning a mass three dimensionally in a stable force field generated by producing entropy waves in liquid helium II. A mass, preferably having an evacuated inner chamber, is contained within a housing filled with the liquid helium II in the space outside the mass. Current passing through a carbon resistance heater mounted within the housing produces entropy waves which produce either a convergent or a divergent force field. The entropy waves produce time average forces at the mass surface that are useful for positioning the mass in the center of the housing cavity.

BACKGROUND OF THE INVENTION

This invention relates to three dimension positioning of a mass and more particularly to positioning a mass three dimensionally while suspended in liquid helium II by means of a stable force field.

In sensing motion such as displacement, velocity or acceleration, various systems have been devised for generating electrical functions which are dependent in magnitude on the character of the motion and are keyed to the direction or sense of the motion. Such systems usually employ a supported mass as a reference element for indicating relative motion. Various electromechanical suspensions have been provided for supporting this mass. Also, divergent and convergent ultrasonic fields have been used to resiliently position the reference element. The electrical mechanical suspensions include frictional forces and hysteresis which not only limits their accuracy but also limits their useful life. Ultrasonic field suspensions have eliminated the frictional and hysteresis problems and are considered relatively long life type devices. However, the ultrasonic waves can be absorbed by the reference element thereby limiting the system sensitivity to motion.

The preesnt invention is directed to an improvement over systems of the type disclosed in the U.S. Pat. 3,232,-120 in which a convergent ultrasonic field was employed to resiliently support a reference element. More specifically, the present invention is directed to a system for three dimension positioning of a mass by means of a stable force field of entropy waves. A single reference element is provided for sensing rotation about each of three mutually perpendicular axes.

In contrast with the electrical, mechanical and ultrasonic wave suspension systems, the present invention employs a reference element suspended in a superfluid bath. The mass is supported in a stable force field of entropy waves generated in the superfluid and so shaped as to provide resilient restraint on the mass to position the same at a reference location in the field. For a rotational sensing system, the reference element is neutrally buoyant in the fluid. For an accelerometer device, the reference element is slightly buoyant, either positively or negatively. A sensing system is then employed for determining the magnitude and direction of movement of the reference element relative to the stable force field.

In a general aspect of this invention, a housing is provided for a reference mass with a superfluid filling the "housing" in the space outside the mass. A sinusoidal heat flux is generated at the housing inner surface which travels toward and is reflected from the suspended mass. The heat waves carry kinetic energy that produce time average forces at the reference mass surface and are useful for positioning the mass in a predetermined location. These time average forces are not density variations as in the case of ultrasonic sounds, but are a temperature variation.

In a more specific aspect of the invention, a spherical housing is provided having a hollow spherical cavity filled with liquid helium II. An evacuated hollow spherical reference element having a specific gravity substantially corresponding with the specific gravity of said liquid is suspended within the housing. A convergent entropy wave is generated in the liquid helium II by means of energizing a carbon resistance heater with an alternating voltage at a frequency of on the order of 100 kHz. The housing and element are such as to permit passage therethrough of radiant energy in the visible spectrum and is characterized by having optical assymmetry. Means are provided for directing at least one light beam through the walls of said housing and said element for sensing rotation of said housing relative to the reference element.

It is a primary object of the present invention to provide a positioning system for a mass free from threshold frictional effects and hysteresis and highly sensitive to accelerations or other modes of movement. A further object of the invention is to provide a system for three dimension positioning of a mass by means of a stable force field. It is a further object of the invention to provide a suspension system wherein thermal waves are reflected from a body to produce time average forces.

SUMMARY

As set forth in the appended claims, this invention relates to a system for positioning a mass three dimensionally in a stable force field wherein the mass is contained within a housing filled with a superfluid. The specific gravity of the superfluid substantially corresponds with the specific gravity of the mass. The mass is positioned by means of entropy waves traveling through the superfluid and reflected therefrom.

A more complete understanding of the invention and its advantages will be apparent from the specification and claims and from the accompanying drawings illustrative of the invention.

BRIEF DESCRIPTION OF THE DRAWINGS

Referring to FIG. 1, the stable force field positioning system shown includes a housing 10 with a reference element 12 contained therein. The reference element 12 contains an evacuated inner chamber 14 and has an outer cylindrical shape conforming generally to the cylindriby means of a support 28. The space within the housing 10 outside the reference element 12 is filled with a superfluid such as liquid helium II.

Superfluid helium, also known as liquid helium II, at temperatures below about 2.2° K. exhibits properties which are different from any known solid, liquid or gas. Because of its peculiar behavior, liquid helium II has been said to be the only representative of a "fourth" state which cannot be identified with either the solid, liquid or gaseous states. Above a temperature of about 2.2° K., known as the "lambda" transition point, liquid helium behaves like any normal low temperature liquid. Below the lambda point, however, superfluid helium behaves in a very abnormal way which cannot be described using normal definitions of viscosity and thermal conductivity. Because of this peculiar behavior, the properties of superfluid helium are defined by what is known as the "two fluid theory." Under the "two fluid theory," the density of liquid helium II may be divided into two parts:

$$\rho = \rho_s + \rho_n$$

where $\rho_s$ is the superfluid component which has a negligible viscosity and $\rho_n$ is the normal component associated with a normal type of viscosity. One of the most peculiar properties of superfluid helium is the negligible viscosity of the superfluid component which flows readily through very small passages on the order of about $10^{-6}$ centimeters.

Another peculiarity of liquid helium II, and probably the most interesting, is the ability of the liquid to propagate two different types of waves. These are first sound, or ordinary sound, in which the superfluid and normal components move in phase with one another, and second sound in which the two components vibrate with a phase difference of 180°. Second sound is a temperature or entropy wave where the superfluid component collects at a point of low temperature while the normal components collects at a point of high temperature half a wavelength away. Second sound can be generated by periodic energizing a heating element just as first sound can be excited by periodic compression of the liquid. The periodic energization of a heating element produces temperature variations in the liquid which propagates as an entropy wave.

Figure 1:
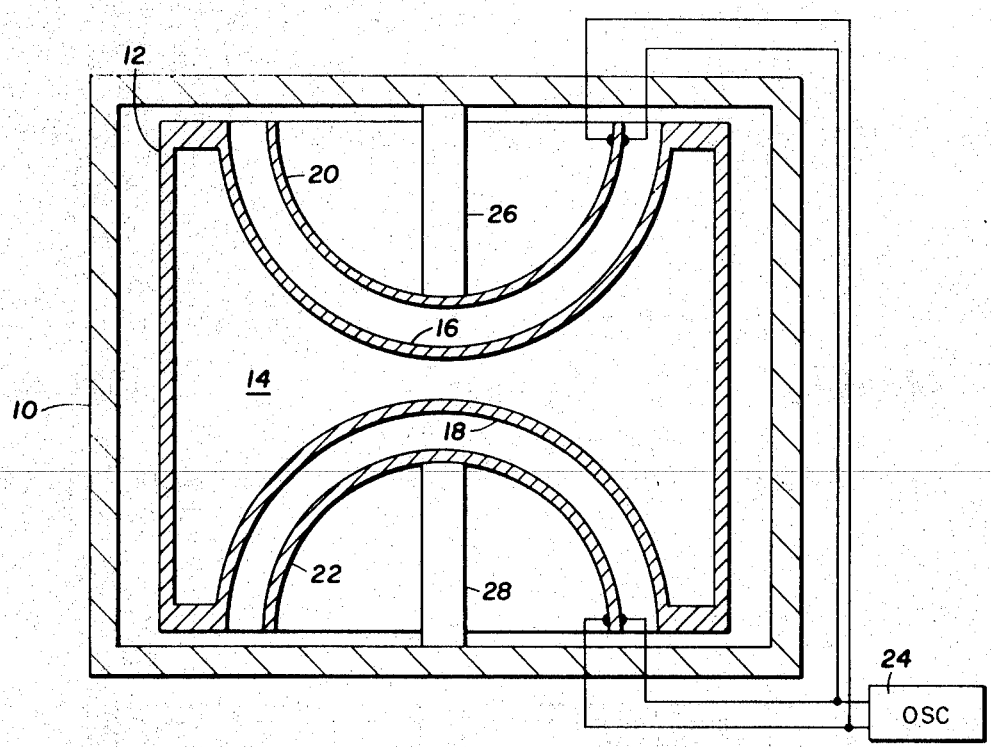
FIG. 1 is a sectional schematic of a divergent field reference element suspension system.
Figure 2:
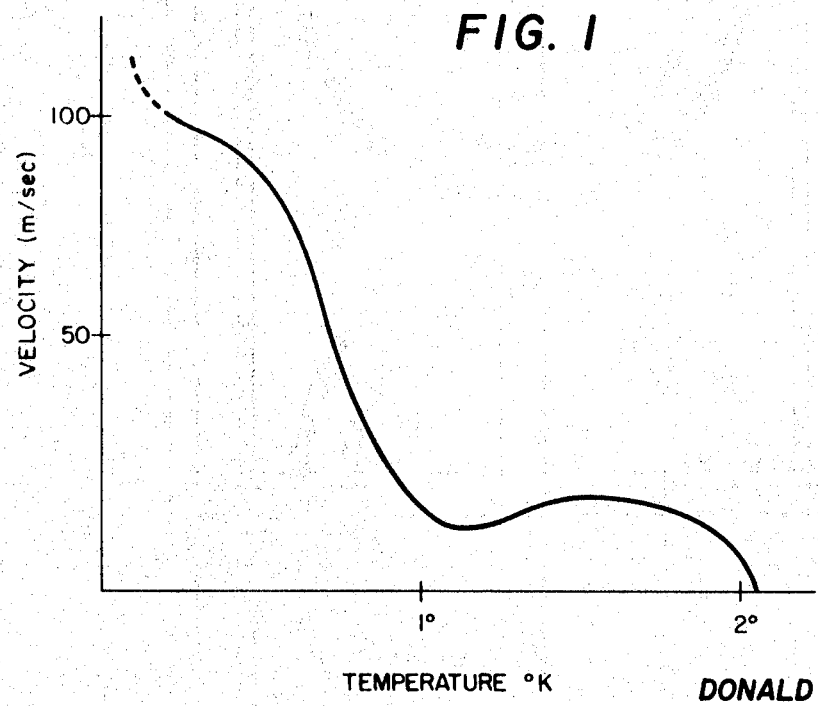
FIG. 2 is a plot of velocity versus temperature for an entropy wave in liquid helium II.

The operation of the system of FIG. 1 is based primarily upon the floatation of the reference elements 12 in the housing 10 and the generation of a time average force field. When a temperature gradient is generated at a surface in helium II, a phenomenon known as internal convection occurs. The kinetic energy of the internal convection heat waves can be expressed by the equation:

$$E = \rho_s \rho_n (v_s - v_n)^2 / 2\rho$$

where $v_s$ is the velocity of the superfluid component and $v_n$ is the velocity of the normal component. In superfluid helium, the normal component propagates the heat wave and the superfluid component occurs in a counterflow direction, thus $\rho_n v_n = -\rho_s v_s$. With a periodic heat flux as generated by energizing the entropy generators 20 and 22 the heat current is given by the equation:

$$q_o = \rho_s T v_n$$

where $s$ is the entropy per gram of liquid helium, and T is the bath temperature in degrees Kelvin. From the above, it can be readily shown that the characteristic velocity of a second sound or thermal wave in the liquid helium is given by the equation:

$$u_2{}^2 = \frac{\rho_s}{\rho_n} \cdot s^2 T / c_p$$

where $c_p$ is the specific heat of the liquid helium at a constant pressure. The variation of second sound velocity with respect to bath temperature is given by the curve of FIG. 2. Unlike ordinary sound, which is characterized by density fluctuations, second sound generates zero linear momentum in the superfluid helium. There is a net momentum flux, however, which gives rise to time average pressures in the fluid and hence to time average forces. Using the equations given above, the time average linear momentum tensor takes the form:

$$\overline{T} = \overline{P} + \frac{\rho}{2}\left[(\overline{\nabla \phi})^2 - \frac{\overline{\phi^2}}{u_1{}^2}\right] + \frac{\rho \rho_n}{2\rho_s}\left[(\overline{\nabla \Psi})^2 - \frac{\overline{\Psi^2}}{u_2{}^2}\right]$$

where $\overline{P}$ is the average ambient pressure, $u_1$ is the speed of ordinary sound (compressional waves) in liquid helium above the lambda point, and $\Delta$ is an operator. The terms $\phi$ and $\psi$ are velocity potentials defined by:

$$\vec{V} = -\nabla \phi$$
$$= \frac{\rho_s \vec{V}_s + \rho_n \vec{V}_n}{\rho}$$
$$\hat{V} = -\nabla \Psi$$
$$= \vec{V}_n - \vec{V}$$

where the symbols $\rightarrow$ and $\wedge$ indicate vectors. Given the boundary conditions on the element, $(\Delta \phi).\hat{n} = (\Delta \psi).\hat{n} = 0$, where $n$ is a unit vector normal to the element surface, then the time average pressure in excess of the ambient pressure in the liquid helium II is given by the equation:

$$\delta \overline{P} = \frac{1}{2} \frac{\rho_n}{\rho_s} \frac{q_o{}^2}{\rho_s{}^2 T^2} [f(hr)^2]$$

where $[f(hr)^2]$ is a resonance factor determined by the geometry of the housing 10.

The pressure effect in the superfluid helium bath is the result of an interference between the incident and reflected wave at the surface of the reference element 12. This is based on the assumption that a thermal mismatch exists between the liquid helium II and the reference element, thus limiting the propagation of the temperature wave into the element. It has been shown both mathematically and experimentally that the internal scattering is negligible with second sound thus validating the above pressure equation.

Figure 3:
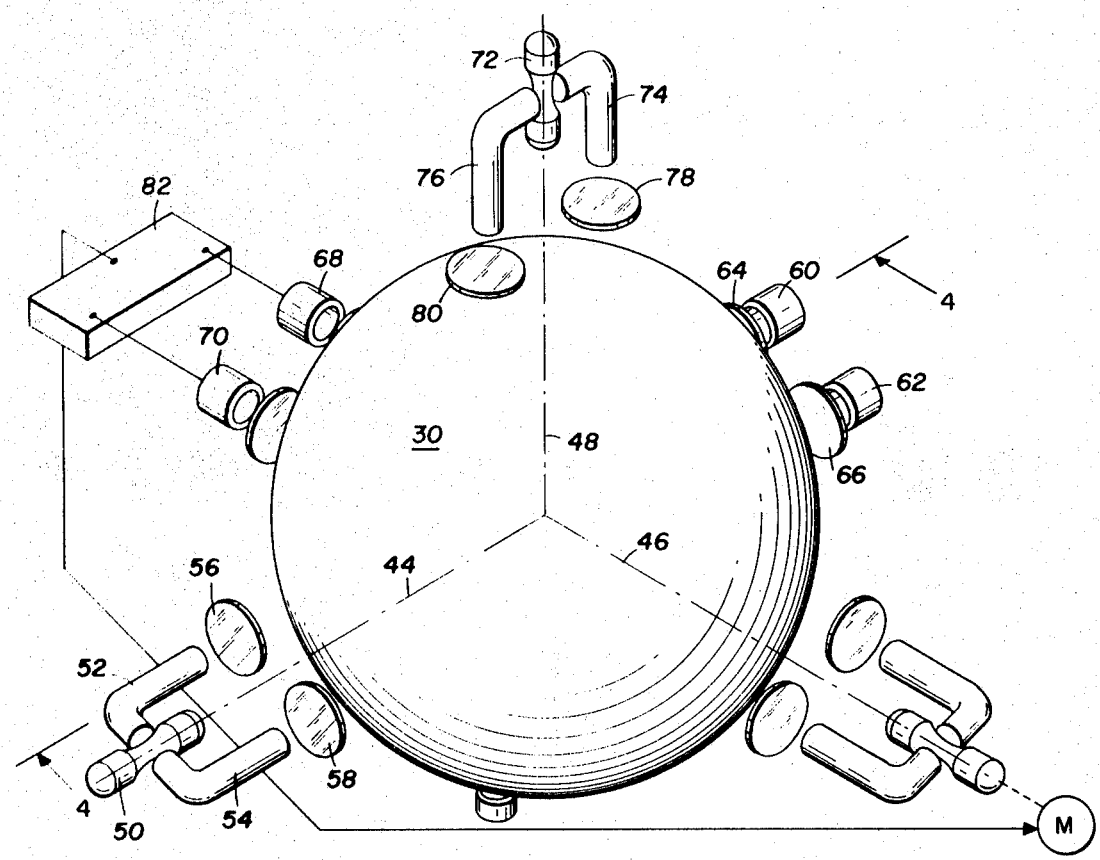
FIG. 3 is a fragmentary perspective view in diagrammatic form of a convergent field embodiment of the present invention.
Figure 4:
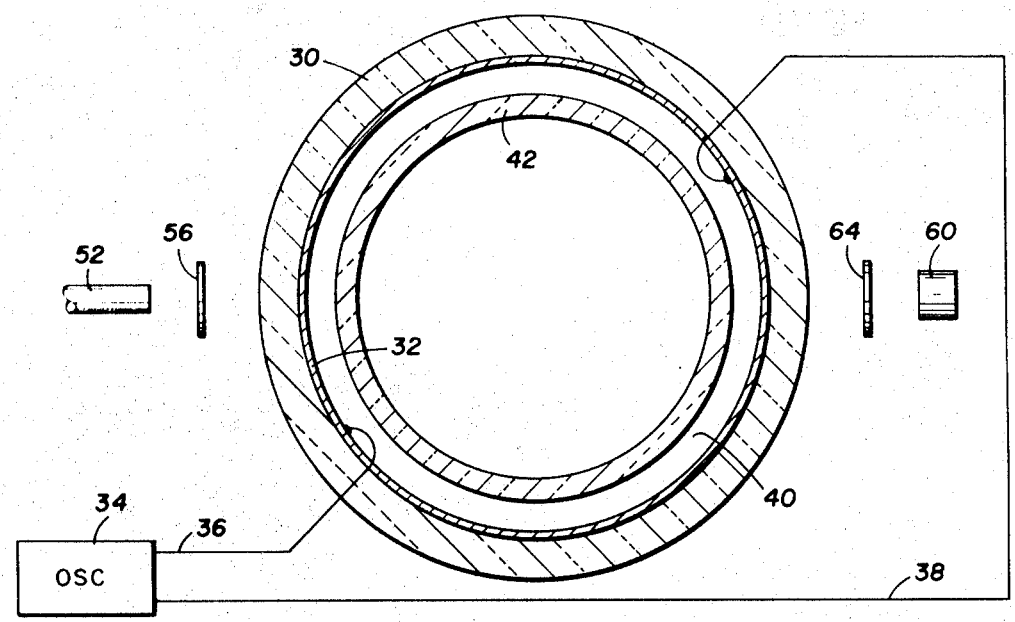
FIG. 4 is a sectional view of the unit of FIG. 3 taken along the line 4—4 of FIG. 3.

With the system of FIG. 1, the entropy generators 20 and 22 produce a divergent field which reflects from the convex shaped ends of the element 12 to produce time average pressures. The frequency of excitation of the generators 20 and 22 and the dimensions of the housing 10 and the reference element 12 are such that the element is normally positioned in the bath with equal pressures generated at all points of the convex surfaces 16 and 18. If the housing 10 or the element 12 move with respect to each other, then the pressure pattern changes and larger pressures exist where the spacing between the element and the housing has been reduced. The asymmetric pattern thus produced in the pressure gradient effective on the element 12 will force the element to move with respect to the housing 10. The restoring forces bring the element 12 back to the equilibrium position with reference to the housing. These forces are resilient and dynamic by reason of the very nature of the generation thereof.

Where the system of FIG. 1 is used for inertial reference applications, means are provided to sense the rotation of the reference element 12 with respect to the housing 10. Referring to FIG. 3, there is shown a spherical inertial reference system wherein the housing is in the form of a sphere 30 of an optically active material. As best seen in FIG. 4, the spherical housing 30 is provided with a coating 32 which is activated to produce entropy waves. The coating 32 may be a relatively thin film of a carbon resistance material, a diamagnetic salt, or other electric/magnetic films. A carbon resistance film would be energized by means of an oscillator 34 through connecting lines 36 and 38. Upon excitation of the coating 32, a convergent force field is generated in the superfluid helium filling the spherical zone 40 between the inner wall of the housing 30 and the outer wall of a reference element 42. The reference element 42 is an evacuated hollow sphere preferably neutrally buoyant in the fluid filling the spherical zone 40. As such, the specific gravity of the reference element 42 is substantially equal to the specific gravity of the fluid in the zone 40. As in the case of the housing 30, the reference element 42 is made of material which is optically active.

By reason of the reaction between the entropy waves converging toward the center of the housing 30 and the surface of the element 42, a stable force field is established in the spherical zone 40. The pressure gradients in the liquid helium II are of such a nature that the reference element will seek an equilibrium position symmetrical within the housing 30, and will be resiliently restrained by the pressure field at such equilibrium position. However, at such position, the reference element 42 is free to rotate having unlimited rotational freedom. The only restraints placed upon the element 42 are the pressure gradients which prevent translation with respect to the walls of the housing 30. Because of the thermal mismatch between the liquid helium II and the material of the reference element 42, the generated temperature wave will not propagate into the element thus reducing internal scattering. This results in only very small torques being delivered to the reference element 42 and the element rotates freely.

The operation of the system of FIGS. 3 and 4 is similar to that described with reference to FIG. 1. In order to measure the rotation about any given axis, a light sensing system may be employed. For measuring purposes, as illustrated in FIG. 3, sensing means are provided on each of the three axes 44, 46, and 48. On the axis 44, there is provided a light source 50 with a pair of optical light pipes 52 and 54 which direct beams of light through the housing 30 and the element 42 after polarization by means of polarizing disks 56 and 58. The light beams passing from the housing 30 are detected by photocells 60 and 62 after passing through polarizers 64 and 66. Such an optical sensing system is well known in the art and thoroughly described in the U.S. 3,232,120.

In the embodiment of FIG. 3, an optical pickoff system is provided for each of the three axes 44, 46 and 48. The photocells 68 and 70 represent the output portion of the pickoff system for the axis 46. The light source 72, light pipes 74 and 76, optical polarizing plates 78 and 80 are portions of the sensing system for the axis 48. A computer or rotation resolver 82, as shown provided for the axis 46, may be provided for each of the axes 44 and 48, so that the total motion of the housing 30 may be described by signals derived from the pickoffs on each of the three axes.

Although not shown, the systems of FIGS. 1 and 3 are maintained at temperatures below the lambda transition point of liquid helium II. As such, the housing 10 and 30 may themselves be supported within a cooling system such as a Dewar. These systems are relatively small and can be packaged for inclusion in systems demanding economy of weight. The elements 12 and 42 may be of the order of 1 inch in diameter. The wall thickness of the reference elements are on the order of about 0.010″ and have a good finish outer surface.

While several embodiments of the invention, together with modifications thereof, have been described in detail herein and shown in the accompanying drawings, it will be evident that various further modifications are possible in the arrangement and construction of its components without departing from the scope of the invention.

What is claimed is:

1. A system for positioning a mass three dimensionally in a stable force field comprising:
    a housing for containing said mass to be positioned by said stable force field,
    a superfluid filling the space of said housing outside the enclosed mass and having a specific gravity substantially corresponding with the specific gravity of said mass, and
    means for generating entropy waves in said superfluid that impinge upon said mass at widely angularly spaced points in different planes to produce a force field reflecting from said mass for three dimensional positioning thereof.

2. A system for positioning a mass three dimensionally in a stable force field as set forth in claim 1 wherein said superfluid is liquid helium II.

3. A system for positioning a mass three dimensionally in a stable force field as set forth in claim 2 wherein said liquid helium II is maintained at a temperature in the range of 0.5° K. to 2.2° K.

4. A system for positioning a mass by means of a stable force field comprising:
    a cylindrical-shaped housing within which said stable force field is generated,
    a first convex-shaped entropy wave generator positioned at one end of said cylindrical-shaped housing,
    a second convex-shaped entropy wave generator positioned at the end of said housing opposite from said first generator,
    a cylindrical-shaped mass having concave upper and lower ends positioned within said housing between said first and second entropy wave generators,
    a superfluid filling the space in said housing outside said mass, said superfluid having a specific gravity substantially corresponding with the specific gravity of said mass, and
    means for energizing said entropy wave generators to produce divergent waves impinging on said mass for positioning thereof.

5. A system for positioning a mass as set forth in claim 4 wherein said first and second entropy wave generators are carbon resistance heaters.

6. A system for positioning a mass as set forth in claim 5 wherein said energizing means produces entropy waves having a frequency of 100 kHz.

7. A system for positioning a mass as set forth in claim 6 wherein said mass has an evacuated inner chamber.

8. A system for positioning a mass as set forth in claim 7 wherein said housing and said mass are made from an optically active material.

9. A system for three dimensional positioning of a mass in a stable force field comprising:
    a spherical housing containing a superfluid with said stable force field generated therein,
    a spherical-shaped mass in said housing, said superfluid filling the space of said housing outside said mass and having a specific gravity substantially corresponding with the specific gravity of said mass, and
    means for generating entropy waves in said superfluid converging toward the center of said mass from at least three widely angularly spaced points to produce a stable force field for three dimensional positioning thereof.

10. A system for three dimensional positioning as set forth in claim 9 wherein said generating means includes a thin resistive film on the inner surface of said housing.

11. A system for three dimensional positioning as set forth in claim 9 wherein said superfluid is liquid helium II maintained at a temperature in the range of 0.5° K. to 2.2° K.

12. A system for three dimensional positioning as set forth in claim 9 wherein said entropy waves have a frequency of 100 kHz.

13. A system for three dimensional positioning as set forth in claim 12 wherein said entropy waves produce a convergent stable force field reflected from said spherical mass.

14. An entropy wave supported inertial reference system comprising:
    a housing of an optically active material, a reference element within said housing, a superfluid filling the space of said housing outside said reference element, said fluid having a specific gravity substantially corresponding with the specific gravity of said reference element, means for generating entropy waves in said superfluid that impinge upon said reference element at widely angularly spaced points in different planes to produce a stable force field for positioning of said element, and means for sensing through the optically active material the rotation of said housing relative to said element.

15. The method of positioning a mass by means of a stable force field comprising:

generating an entropy wave in a superfluid contained within a housing to produce a stable force field directed against a mass suspended within said superfluid at least three widely angularly spaced points in different planes for positioning thereof.

16. The method of positioning a mass as set forth in claim 15 includes the step of maintaining said superfluid at a temperature in the range between 0.5° K. to 2.2° K.

17. The method of positioning a mass as set forth in claim 16 wherein said entropy wave generates a divergent field impinging on said mass.

18. The method of positioning a mass as set forth in claim 16 wherein said entropy wave generates a convergent field against said mass.

References Cited

UNITED STATES PATENTS

| 3,232,120 | 2/1966 | Ensley | 73—505 |
| 3,293,919 | 12/1966 | Ensley | 73—505 |

JAMES J. GILL, Primary Examiner

U.S. Cl. X.R.

308—10

UNITED STATES PATENT OFFICE

CERTIFICATE OF CORRECTION

Patent No. 3,616,697　　　　　　　　　Dated Nov. 2, 1971

Inventor(s) Donald L. Ensley

It is certified that error appears in the above-identified patent and that said Letters Patent are hereby corrected as shown below:

Col. 1, line 48, "preesnt" should be --present--.
Col. 3, line 45, "elements" should be --element--;
　　　line 61, "$q_o = \rho_s T v_n$" should be --$q_o = \rho s T v_n$--.
Col. 4, line 11, "$\Delta$" should be --$\nabla$--;
　　　line 23, "$(\Delta\phi).n = (\Delta\psi).\hat{n} = 0$" should be --$(\nabla\phi).n = (\nabla\psi).\hat{n} = 0$--;
　　　line 24, "n" should be --$\hat{n}$--.
Col. 5, line 41, after "U.S." insert --Patent--;
　　　line 61, "0,010" should be --0.010--.
Col. 8, line 2, "includes" should be --including--.

Signed and sealed this 30th day of May 1972.

(SEAL)
Attest:

EDWARD M. FLETCHER, JR.　　　　　ROBERT GOTTSCHALK
Attesting Officer　　　　　　　　Commissioner of Patents